UNITED STATES PATENT OFFICE.

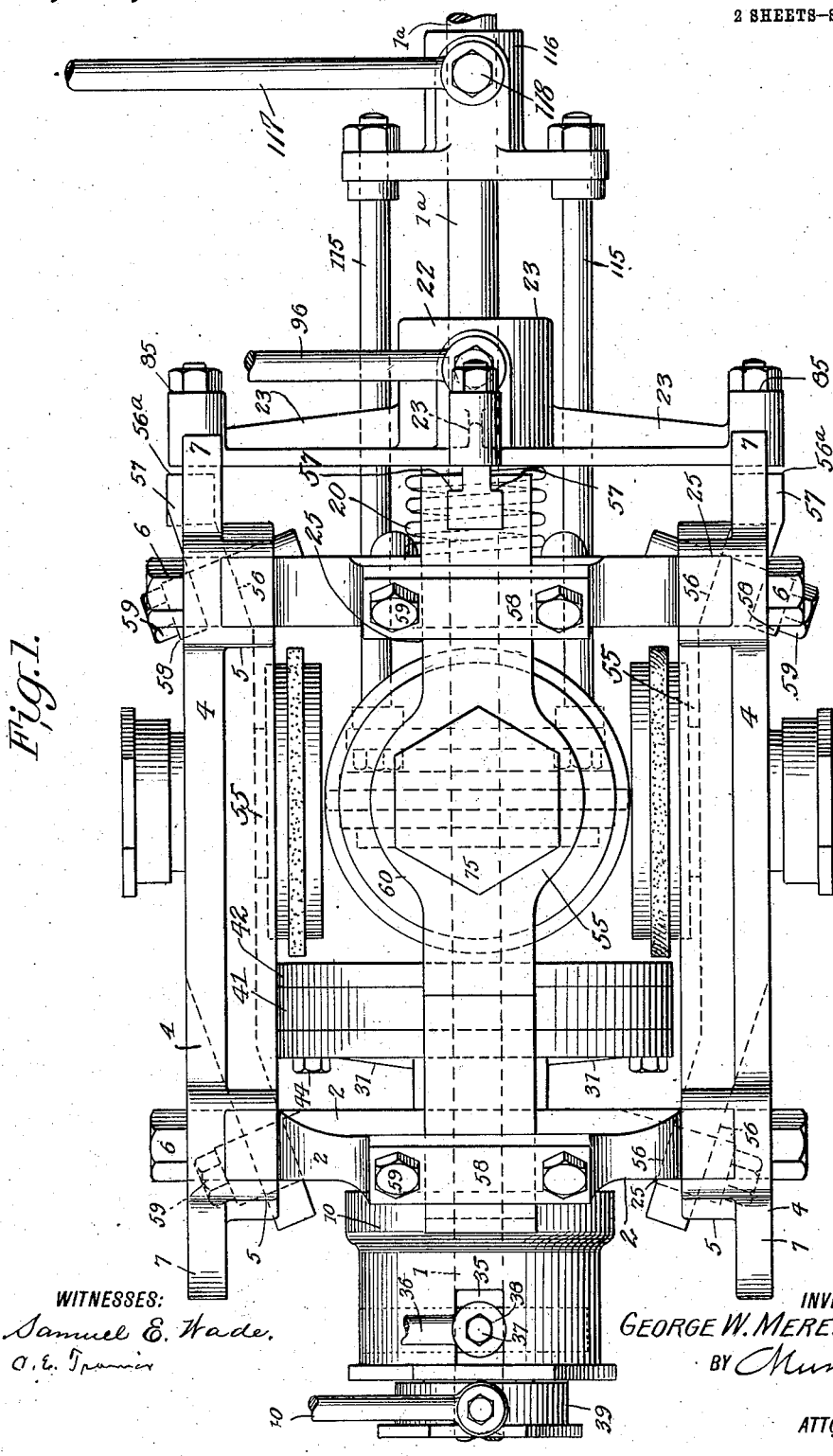

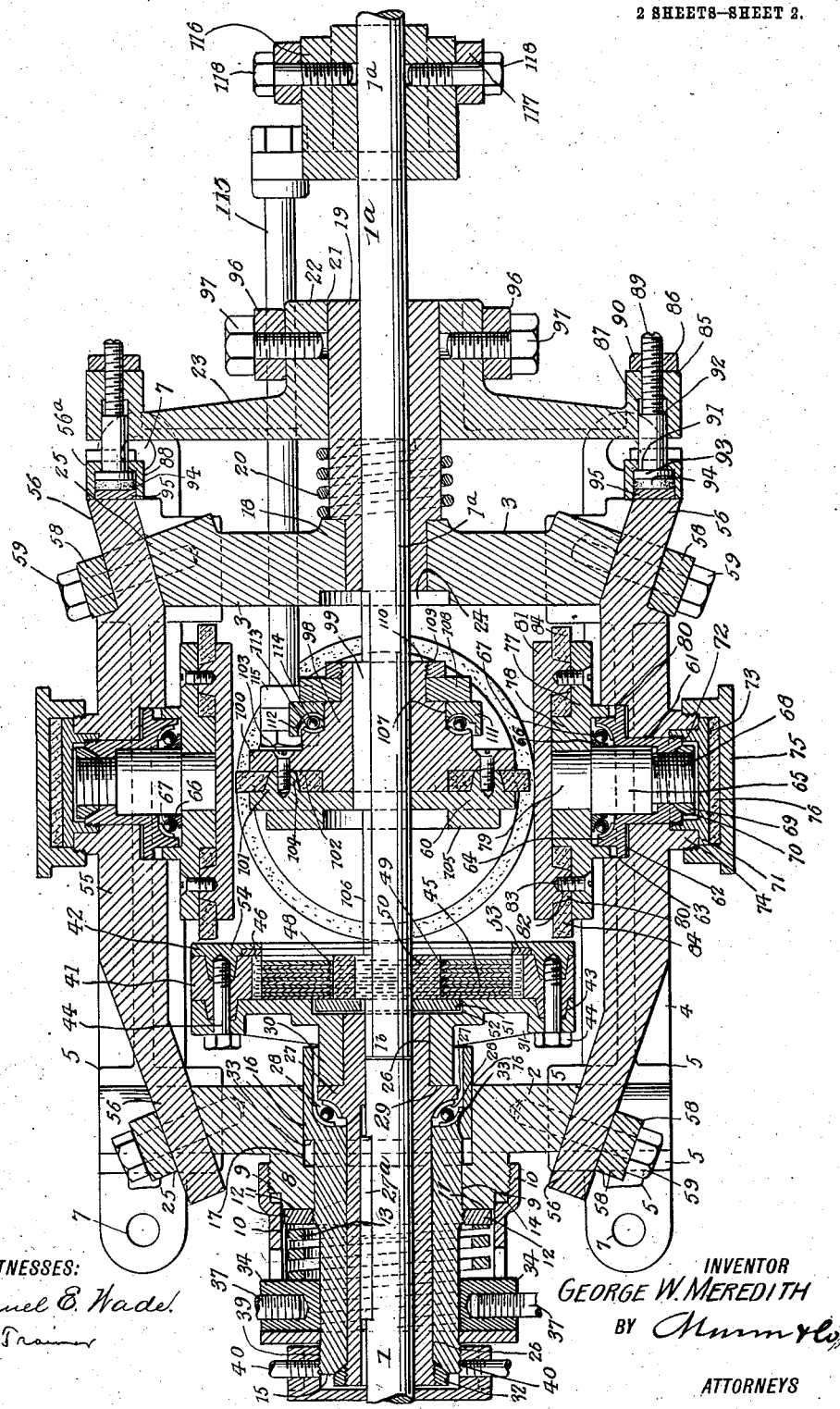

GEORGE WASHINGTON MEREDITH, OF CHICAGO, ILLINOIS.

TRANSMISSION-GEARING.

1,027,268.  Specification of Letters Patent.  Patented May 21, 1912.

Application filed September 16, 1910. Serial No. 582,292.

*To all whom it may concern:*

Be it known that I, GEORGE W. MEREDITH, a citizen of the United States, and a resident of Chicago, in the county of Cook and State of Illinois, have invented certain new and useful Improvements in Transmission-Gearing, of which the following is a specification.

My invention is an improvement in frictional transmission gearing, and consists in certain novel constructions and combinations of parts hereinafter described and claimed.

While otherwise useful my invention is particularly applicable to motor driven vehicles.

It is one of the objects of this invention to provide for accurate adjustment of parts relative to each other thereby making the most efficient means for securing and distributing and equalizing the pressures of contact, so as to obtain a transmission of the maximum horse-power.

It is also one of the objects of my invention to provide for the simple and easy application and release of the pressures of contact.

A further object is to provide a convenient and an efficient means for releasing temporarily the frictional reducing gears when on full speed and driving direct through the medium of a multiple disk clutch.

These and other ends in view will readily appear as the nature of the invention is better understood.

In the accompanying drawings has been illustrated a simple and preferred form of the invention, it being understood, however, that no limitation is necessarily made to the precise structural details therein exhibited, but that changes, alterations and modifications within the scope of the invention may be resorted to when desired.

Referring to the drawings forming a part hereof, Figure 1 is a plan view of the improved transmission gearing, and, Fig. 2 is a horizontal sectional view of the improvement.

The numbers to which references will be had throughout the specifications, are interchangeable with reference to both the plan and sectional views.

Referring to the plan view, Fig. 1, the driving shaft 1, leading from the engine crank shaft, to which it is preferably joined by a universal joint, and the driven shaft 1ª are journaled in alinement, their adjacent ends 1ᵇ, Fig. 2, meeting in a common sleeve. With reference to the driving and driven shafts, all other members of the mechanism are axially arranged.

In the plan view Fig. 1 there is clearly shown an outer framework consisting of six main castings, viz: a forward smaller irregularly formed plate 2, and a rearward larger irregularly formed plate 3 and four ribbed inter-changeable corner bars 4; the four corner bars being joined by counter bracings 5 and by screw bolts 6 to plates 2 and 3 at their respective four corners and at right angles therewith. The four corner bars 4 carry end extensions 7 bored to bolt to the frame of the vehicle. The forward plate 2, Fig. 2, has an annular extension or hub 8 on its outer central surface and concentric therewith, being threaded and shouldered at 9 to receive the cap 10. The outer surface 11 of the annular extension 8 carries the threaded collar 12, which in turn furnishes a bearing for the inner end of the spiral spring 13. The hub 8 is bored concentric with its center to form a bearing surface 14 for the sleeve 15. The inner central surface of plate 2 is counterbored concentric therewith to form an enlarged bearing surface 16, for the enlarged part of the sleeve 15 and shouldered at 17 to limit the outward movement of the sleeve 15.

The rearward plate 3, Fig. 2, has a hub 18, concentric with its outer central surface bored to receive the extended journal box 19. The journal box 19 acts as a retainer for the spiral spring 20, and also a bearing surface or guide 21, for the hub 22 of the four armed spider 23. The plate 3 is counterbored at 24 concentric with its inner central surface.

The plates 2 and 3, Figs. 1 and 2, each have formed in their outer edges midway between their several four corners transverse recesses 25, beveled toward the front.

Journaled inside of the sleeve 15 is a second sleeve 26 splined by the key 27ª to the shaft 1 but longitudinally movable thereto and revolving circumferentially therewith. The sleeve 26 is provided near its inner end with an annular rib 27. Between the annular rib 27 of the sleeve 26 and the enlarged portion 16 of sleeve 15 are grooves and countergrooves for some common design of ball bearings 28. Against the inner shoulder 29 of the annular rib 27 and upon the inner extension of the sleeve 26 is swaged the hub 30 of the driving wheel 31, Fig. 1. The outer end of sleeve 26 is threaded and engaged by a plain cone bearing 32. The bearing sleeve 15 is shouldered at 33 to correspond with the shoulder 17 of the hub 8, and the bearing sleeve 15 at its outer edge engages the cone bearing 32 of the sleeve 26.

A cap 10 is threaded onto the outer end of the hub 8 and a spiral spring 13 encircles the sleeve 15 in the cap, the outer end of the spring engaging a collar 34 and the inner end of the spring engaging the outer face of the collar 12, the collar 12 being threaded onto the sleeve 15. The collar 34 engages the cap 10 and loosely surrounds the sleeve 15 and is slidably arranged thereon, being operated through a slot 35 in the cap 10 by a fork lever 36, Fig. 1. The fork lever 36 is secured to the collar 34 by a screw-bolt 37 and lock-nut 38, Fig. 1. The bearing sleeve 15 has an outward yielding movement in the hub 8 limited by the spring 13 and the corresponding shoulders 17 and 33, while the tension of the spiral spring 13 is regulated by the slidable collar 34. Threaded onto the outer end of the sleeve 15 is a second cap 39 and to the cap 39 is bolted a fork lever 40, Fig. 1. By means of the lever 40 and its connections with the cap 39, and sleeve 15, the cone bearing 32, and the sleeve 26, the driver wheel and clutch retainer 31, and the sleeves 15 and 26 are all as a unit pulled outward and forward limited only by the spiral spring 13 and the shoulders 17 and 33, thus releasing the pressures of contact, thereby breaking the connection between the power plant and the vehicle hereinafter described.

The driver wheel 31, Fig. 2, is composed of a plurality of superposed rings 41 and 42, secured to the inner face of the wheel concentric with the shaft 1, by means of bosses 43 and cap screws 44. A plurality of superposed disks 45 of fiber and metal, or the like, are arranged inside the ring 14; and the outer edges 46 of the larger of the disks 45, are grooved at regular intervals to receive the lugs 47 cast at correspondingly regular intervals on the inner surface of the ring 41, while the inner edges 48 of the smaller of the disks 45 are grooved at regular intervals, to receive the lugs 49 arranged at correspondingly regular intervals on the outer annular surface of the collar 50, the collar 50 being longitudinally movably splined on the shaft $1^a$ and revolving therewith. The collar 50 is shouldered at 51 and held in position by the disks 45, and the inner surface of the wheel 31 is counter-sunk at 52 to receive the shoulder 51 of the collar 50. The disks 45 are held in place by a ring 53 seated in the annular recess in the inner face of the ring 42. The disks 45 constitute the multiple disk clutch, the larger ones moving circumferentially with the shaft 1, and the smaller ones moving circumferentially with the shaft $1^a$, so that when sufficient pressure is brought to bear upon the flat surface of the disks, the larger and smaller being alternately arranged from front to back, the smaller or driven disks are made to revolve in unison with the larger or driver disks, the pressure of contact determining their efficiency. The ring 42 is composed of aluminum or some like frictional material and its inner face 54 is adapted for engagement by the extended edges of the wheels whose axis of rotation is at right angles to the shafts 1 and $1^a$. The driver wheel proper, therefore, is composed of the three main elements, viz: the hub and flange 31, the ring 41, and the larger disks, and the frictional ring plate 42.

Longitudinally arranged with respect to the shafts 1 and $1^a$ and midway between and in line with the four interchangeable ribbed corner bars 4, and moving longitudinally in the several beveled transverse recesses 25 of the plates 2 and 3 are four interchangeable bars 55: These bars are similar in shape and are secured in a similar manner, so that but one and its connections will be described. The two ends of these bars are provided with obliquely angled bearing surfaces 56, the portion at one end extending in the opposite direction from the portion at the other end. The rear angle extensions have at their outer ends shorter extensions $56^a$ extending substantially parallel with the main bar 55, each of the said parallel extensions being provided in its outer end face with a T-shaped recess 57, Fig. 2. The degree of angle of the oblique bearing extension or portion 56 is such that for every three units of forward movement the said surface moves inward one unit, that is the ratio of the forward movement to the inward movement is as three to one.

The angle bearing portions 56 are held in the transverse recesses 25 of the plates 2 and 3 by transverse straps 58 and screw bolts 59 one on each side of the bar portion 56. Each of the bars 55 is provided at its center with a circular enlargement 60, having an opening in which is seated a bearing sleeve 61, having at its inner end an annular flange 62 engaging an enlargement 63 of the opening. An annular lateral rib 64 is formed on the inner face of the flange 62 and the inner face of the rib is grooved to form one section of a ball race.

The journal pin 65 of a wheel to be described in detail is journaled in the sleeve 61 and is provided with an annular rib 66 having a groove coöperating with the groove of the rib 64 and balls 67 are seated in the race formed by the said grooves. The outer end of the journal pin is reduced and threaded as at 68, and is engaged outside of the sleeve by a ring 69 having its inner end beveled at 70 and seated in a beveled recess in the end of the sleeve 61. A cap 71 is threaded onto the end of the bearing sleeve, an annular shoulder 72 being formed in the cap against which the end of the sleeve fits, and the cap is provided with a marginal lateral flange 73 seating on the end of an annular rib 74, the said annular rib being cast integral with the bars 55. A cap 75 is threaded onto the annular rib 74 and a cushion 76 of rubber, or other suitable material, in the shape of a close fitting disk, is arranged between the caps 71 and 75, and by means of cap 75, lateral adjustment is had of said wheel hereinafter described. The wheel consists of a disk 77 having a hub 78 to receive a reduced portion 79 of the journal-pin 65, and an annular dust rib 80, a second disk 81 of aluminum or other friction material, secured to the inner face of the first disk by bosses 82 and screws 83. The second disk seats against the end of the hub 78 which extends beyond the face of the first disk, and a ring 84 of fiber or the like material is arranged between the disk encircling the hub and extending beyond the disk and hub.

It will be understood that in this preferred form the shaft 1ª is encircled by the four wheels just described, the said wheels being arranged alternately at angles of 90° with respect to each other, while their axes of rotation are always at right angles to the shaft 1ª. Being interchangeable, the diameters and the constructions and the mountings of the four wheels are the same in each instance, it will be evident that each is mounted to revolve radially with respect to its axes and to yield radially from the shaft 1ª, and to move forward and inward or backward and outward in unison with its supporting angle bar 55. While in this preferred form four wheels are thus arranged and used, it will also be understood that two or more may be used and when two are so used, they will be arranged directly opposite each other at angles respectively of 180°, and will operate parallel with each other.

The outer end of each of the four arms of the spider 23 is provided, at right angles thereto, with an elongated portion 85, Figs. 1 and 2, said elongated portion being bored, counter-bored and threaded as at 86, Fig. 2, and forming a shoulder 87 therein. Connection is had between the elongated portions 85 of the arms of the spider 23 and the rear extension of the bars 55 by means of an adjusting block 88, Fig. 2, and an adjusting bolt 89 and lock nut 90. The adjusting block 88 is bored and counter-bored forming an inner shoulder 91 and has a neat sliding fit in the enlarged portion of the T-shaped recess 57, Fig. 1. The adjustable bolt 89, Fig. 2, is shouldered and threaded at 92 to correspond with the shouldered and threaded portion of 85, and its head 93 is seated in the enlarged bore against the shoulder 91 of the adjusting block 88. Superposed upon the head 93 of the adjusting bolt 89 and inside the adjusting block 88, is first a close fitting disk of rubber or other cushion material 94 and lastly a similarly close fitting disk of steel 95, the steel disk 95 and the end of the angle bar 55 forming a limited sliding bearing surface. Attention is called to the cushion disk 94 which provides automatic adjustment for any slight inequalities of pressures at the points of contact of the fiber wheel 84 against the friction ring 42 at its inner face 54. Other means of adjustment is had for these pressures of contact by the bolt 89 and lock-nut 90.

The four armed spider 23 is operated forwardly by the fork lever 96, Fig. 1, and rearwardly by the coil spring 20. The fork lever 96 is secured to the hub 22 of the spider 23 by screw bolts 97. In the operation attention is called to the adjusting connection between the spider, which is controlled by the fork lever, and the angle bearing of the side bars. When the side bars are pushed forward and inward the adjusting blocks move at right angles to the line of the machine, thus providing adjustment, as between spider and side bearing bars, by a sliding movement, instead of direct connections by bolt as is common in such cases.

A wheel is movable longitudinally of the shaft 1ª, and the said wheel comprises a hub 98, having a key 99, the said hub having an annular flange 100, to which is secured a disk 101, also having the key 99, and a ring 102 of fiber or like material is arranged between the disk and the flange. The screws 103 are passed through the flange and engage bosses 104 on the rear or inner face of the disk 101, and the ring of fiber 102 extends outside of the disk and flange as shown in Fig. 2, and is adapted to engage the frictional faces 81, of the four wheels previously described. The disk 101 is provided on its outer face with an annular flat rib 105 concentric with the shaft 1ª.

The key 99 is rigid with the wheel just described, and the key-way 106 in the shaft 1ª in which the key moves extends from the counterbore 24 of the rearward plate 3 to the end of the shaft at 1ᵇ, Fig. 2. This allows for easy placing of the wheel just described and the movably splined collar 50 of the multiple disk clutch. It also allows for the easy and free movement of the wheel just described, upon the driven shaft 1ª, in securing the varying revolutions of both the forward and reverse speeds, and finally it permits the above said wheel to be moved forward from the lowest to the highest speeds, until the face of the annular rib 105 is brought into sufficient frictional contact with the disks 45 to secure direct drive on full speed ahead.

The hub 98 of the wheel is provided with an annular groove 107, one wall of which is formed by the hub and the other by a ring 108, which in turn is held in place by a second ring 109, threaded onto a reduced portion 110 of the hub, and a collar 111 is rotatable in the groove. The collar 111 has a groove 112 on its inner face, and the hub is provided with a coöperating groove, the two grooves forming a thrust ball race 113 for receiving an annular series of balls 114, and a plurality of links 115 are secured to the collar 111 and connect with a collar 116 slidable on the shaft 1ª beyond the journal box 19. The fork lever 117, Fig. 1, is connected to the collar 116 by a screw bolt 118.

It will be evident that the said four wheels arranged alternately at right angles to each other, and the driving wheel 31, on the driving shaft 1, are all permitted a yielding movement away from the wheels which engage them, while the driven wheel on the driven shaft 1ª is slidably keyed thereon and revolves circumferentially therewith, and one of the engaging portions between the wheels is of fiber, so that the device will be practically noiseless when in operation. The parts may be readily assembled and taken apart and the principal bearings are ball, so that friction is reduced to a minimum.

The operation of the mechanism may be briefly described as follows: The motive power being operatively connected, the driving shaft 1 and the driving wheel 31 rotate to the right. By a foot pedal the lever 96 is made to push the four armed spider 23 forward and by means of its connections with the four angle bearing bars 55, both the bars and their respective friction wheels move toward a common center, the angle being such that the ratio of the forward movement to the inward movement is as three to one; this arrangement is such that when these bars move forward 1/32 of an inch, the disks 84 of said driven wheels, while said wheels are yet without load, are brought into contact, first with the friction surface 54 of the ring 42 of the driver wheel 31. Now it will be evident that these said four wheels move in a common direction, that is from left to right, when viewed from their inner frictional surfaces 81. The driver wheel 31 being arranged yieldably longitudinally, allows the driven wheels a further movement forwardly of 2/32 of an inch, thereby bringing the said four wheels in toward the center 1/32 of an inch till they come into rolling contact, secondly, at their frictional surfaces 81 with the outer edge of the fibrous disk 102 of the wheel movably splined to the shaft 1ª. It will be observed here that if there should be any inequalities of pressures at the several points of contact that the resilient materials 76 and 94 will automatically equalize them. When pressure is brought to bear through the spider 23 and its connections, viz: bolt 89, its head 93, the cushion material 94, the steel disk 95, and the adjusting block 88, upon the end of the side bars 55 the said bars move inward while the adjusting blocks 88 with their internal elements remain stationary laterally but still operating within the T-shaped recess 57 thereby producing a sidewise sliding bearing contact. The fiber disk 102 at its outer edge is at a neutral point on the surfaces of the disks 81 and therefore remains stationary. The variations of the forward speeds are obtained by causing the fibrous wheel 102 to move forwardly from the center of the frictional surfaces 81 and over said surfaces to their outer edges at which point the highest speed possible is had. At this time the forward surface of the annular extension 105 of the wheel slidably splined to shaft 1ª is forced into frictional contact with the multiple disk clutch contained in the driver wheel 31 and direct drive is obtained from the driving shaft 1 to the driven shaft 1ª, and at the same time the pressure is released from the lever 96 and by means of the spring 20 the frictional reducing wheels and their supporting bars are forced back to their original positions. By means of the lever 36, the tension of the spring 13 is regulated, while by the lever 40 the whole driver wheel and its internal multiple disk clutch is drawn forward thereby breaking the connection between the driving and driven shafts. By the use of this same lever 40, the clutch may be brought into contact with the surface of 105 again, or the wheel slidably splined to the shaft 1ª may be drawn to a neutral position and by the lever 96 the frictional reducing gears may be employed again in transmitting the power. If the reverse drive is desired, the wheel slidably positioned on shaft 1ª may be drawn backward from the neutral point, toward the plate 3, thereby securing a limited reverse speed of said shaft. The above operation may be repeated as often as desired, thereby obtaining an easy and simple application of the power employed.

I claim:—

1. A device of the class described, comprising a driving shaft and a driven shaft in alinement with each other, a disk slidable on the inner end of the driving shaft and keyed thereto, a collar slidable on the inner end of the driven shaft and keyed thereto, a multiple disk clutch arranged between the disk and the collar, a spring normally pressing the disk toward the driven shaft, means for moving the said disk toward and from the driven shaft, a disk slidable on the driven shaft and keyed thereto, means for moving the said disk, a plurality of bars arranged substantially parallel with the said shafts, and movable longitudinally thereof, a wheel journaled in each of said bars radially of the driven shaft, means for mounting said wheels to yield radially, means for constraining the said bars to move toward the driven shaft when the said bars are moved toward the driving shaft, and for constraining said bars to move away from the driven shaft when the said bars are moved away from the driving shaft, the faces of said wheels being adapted to contact with the periphery of the disk on the driven shaft and the peripheries of the said wheels being adapted to contact with the face of the disk on the driving shaft, the disk on the driven shaft having an annular flange on the face thereof for operating the multiple disk clutch to connect the driven shaft and the driving shaft when the said disk is at the limit of its movement toward the driving shaft, means for simultaneously moving the said bars, said means including a yielding connection, and a spring for returning the said moving means.

2. A device of the class described, comprising a driving shaft and a driven shaft in alinement with each other, a disk slidable on the inner end of the driving shaft and keyed thereto, a collar slidable on the inner end of the driven shaft and keyed thereto, a multiple disk clutch arranged between the disk and the collar, a spring normally pressing the disk toward the driven shaft, means for moving the said disk toward and from the driven shaft, a disk slidable on the driven shaft and keyed thereto, means for moving the said disk, a plurality of bars arranged substantially parallel with the said shafts, and movable longitudinally thereof, a wheel journaled in each of said bars radially of the driven shaft, means for mounting said wheels to yield radially, means for constraining the said bars to move toward the driven shaft when the said bars are moved toward the driving shaft, and for constraining said bars to move away from the driven shaft when the said bars are moved away from the driving shaft, the faces of said wheels being adapted to contact with the periphery of the disk on the driven shaft and the peripheries of the said wheels being adapted to contact with the face of the disk on the driving shaft, the disk of the driven shaft having an annular flange on the face thereof for operating the multiple disk clutch to connect the driven shaft and the driving shaft when the said disk is at the limit of its movement toward the driving shaft, means for simultaneously moving the said bars, and a spring for returning the said moving means.

3. A device of the class described, comprising a driving shaft and a driven shaft in alinement with each other, a disk slidable on the driving shaft and keyed thereto, a collar slidable on the driven shaft and keyed thereto, a multiple disk clutch arranged between the disk and the collar, a spring normally pressing the disk toward the driving shaft, means for moving the said disk toward and from the driven shaft, a disk slidable on the driven shaft and keyed thereto, means for moving the said disk, a plurality of wheels journaled radially of the said shafts and in spaced relation, means for mounting the said wheels to yield radially, means for simultaneously moving the said wheels longitudinally of the shaft, a yielding connection between the wheels and the moving means, means for constraining the wheels to move radially toward the driven shaft when they are moved toward the driving shaft and for constraining the said wheels to move radially away from the driven shaft when they are moved away from the driving shaft, the faces of the said wheels being adapted to contact with the periphery of the disk on the driven shaft, and the peripheries of the said wheels being adapted to contact with the face of the disk on the driving shaft, the disk of the driven shaft having means for operating the multiple disk clutch to connect the driven shaft and the driving shaft when the said disk is at the limit of its movement toward the driving shaft, and a spring for moving the wheels away from the driving shaft.

4. A device of the class described, comprising a driving shaft and a driven shaft in alinement with each other, a disk slidable on the driving shaft and keyed thereto, a collar slidable on the driven shaft and keyed thereto, a multiple disk clutch arranged between the disk and the collar a spring normally pressing the disk toward the driven shaft, means for moving the said disk toward and from the driven shaft, a disk slidable on the driven shaft and keyed thereto, means for moving the said disk, a plurality of wheels journaled radially of the said shafts and in spaced relation, means for mounting the said wheels to yield radially, means for simultaneously moving the said wheels longitudinally of the shaft, means for constraining the wheels to move radially toward the driven shaft when they are moved toward the driving shaft and for constraining the said wheels to move radially away from the driven shaft when they are moved away from the driving shaft, the faces of the said wheels being adapted to contact with the periphery of the disk on the driven shaft, and the peripheries of the said wheels being adapted to contact with the face of the disk on the driving shaft, the disk of the driven shaft having means for operating the multiple disk clutch to connect the driven shaft and the driving shaft when the said disk is at the limit of its movement toward the driving shaft, and a spring for moving the wheels away from the driving shaft.

5. In a device of the class described, a driven shaft and a driving shaft in alinement with each other, a disk slidable on the driving shaft and keyed thereto, a disk slidable on the driven shaft and keyed thereto, a multiple disk clutch arranged between the shafts for connecting them together, a plurality of wheels journaled radially of the shafts and adapted to contact at their peripheries with the disk on the driving shaft and at their faces with the disk on the driven shaft, means including a yielding connection for simultaneously moving the said wheels longitudinally of the shafts, the disk on the driven shaft having means for operating the clutch at the end of its movement toward the driven shaft, means for constraining the wheels to move toward the driven shaft when they are moved toward the driving shaft and for constraining the said wheels to move away from the driven shaft when they are moved away from the driving shaft, and a spring for moving the said wheels away from the driving shaft.

6. In a device of the class described, a driven shaft and a driving shaft in alinement with each other, a disk slidable on the driving shaft and keyed thereto, a disk slidable on the driven shaft and keyed thereto, a multiple disk clutch arranged between the shafts for connecting them together, a plurality of wheels journaled radially of the shafts and adapted to contact at their peripheries with the disk on the driving shaft and at their faces with the disk on the driven shaft, means for simultaneously moving the said wheels longitudinally of the shafts, the disk on the driven shaft having means for operating the clutch at the end of its movement toward the driven shaft, means for constraining the wheels to move toward the driven shaft when they are moved toward the driving shaft and for constraining the said wheels to move away from the driven shaft when they are moved away from the driving shaft, and a spring for moving the wheels away from the driving shaft.

7. In a device of the class described, a driven shaft and a driving shaft in alinement with each other, a disk slidable on the driving shaft and keyed thereto, a disk slidable on the driven shaft and keyed thereto, a multiple disk clutch arranged between the shafts for connecting them together, a plurality of wheels journaled radially of the shafts and adapted to contact at their peripheries with the disk on the driving shaft and at their faces with the disk on the driven shaft, means for simultaneously moving the said wheels longitudinally of the shaft, the disk on the driven shaft having means for operating the clutch at the end of its movement toward the driven shaft, and means for constraining the wheels to move toward the driven shaft when they are moved toward the driving shaft and for constraining the said wheels to move away from the driven shaft when they are moved away from the driving shaft.

8. In a device of the class described, a driven shaft, and a driving shaft in alinement with each other, a disk slidable on the driving shaft and keyed thereto, a disk slidable on the driven shaft and keyed thereto, means for directly connecting the shafts, a plurality of wheels journaled radially of the shafts and adapted to contact at their peripheries with the disk on the driving shaft and at their faces with the disk on the driven shaft, means for constraining the said wheels to move radially toward the driven shaft when they are moving longitudinally toward the driving shaft and for constraining the said wheels to move radially away from the driven shaft when they are moved longitudinally away from the driving shaft, means for mounting the said wheels to yield radially with respect to the shafts, means including a yielding connection for simultaneously moving the said wheels, and means operated by the disk on the driven shaft at the end of its movement toward the driving shaft for directly connecting the said shafts.

9. In a device of the class described, a driven shaft and a driving shaft in alinement with each other, a disk slidable on the driving shaft and keyed thereto, a disk slidable on the driven shaft and keyed thereto, a plurality of wheels journaled radially of the shaft and adapted to contact at their peripheries with the disk on the driving shaft, and at their faces with the disk on the driven shaft, means for constraining the wheels to move radially toward the driven shaft when they are moved longitudinally toward the driving shaft and for constraining the said wheels to move radially away from the driven shaft when they are moved longitudinally from the driving shaft, means for simultaneously moving the wheels, and means operated by the disk on the driven shaft at the end of its movement toward the driving shaft for directly connecting the said shafts.

10. In a device of the class described, a driven shaft and a driving shaft in alinement with each other, a disk keyed to each of said shafts and slidable thereon, a wheel journaled radially of the driven shaft, means including a yielding connection for moving the wheel longitudinally of the shaft, means for constraining the said wheel to move radially toward the said shaft when moved longitudinally toward the driving shaft, whereby to cause successively the periphery of the said wheel to contact with the face of the disk on the driving shaft and the face of the said wheel to contact with the periphery of the disk on the driven shaft, means for moving the disk on the driven shaft toward and from the driving shaft, means operated by the said disk for directly connecting the shafts at the end of its movement toward the driving shaft, means for mounting the said wheel to move radially away from the said shafts, a spring for returning said wheel to original position, yielding means normally pressing the disk on the driving shaft toward the disk on the driven shaft, and means for moving the said disk.

11. In a device of the class described, a driven shaft and a driving shaft in alinement with each other, a disk keyed to each of said shafts and slidable thereon, a wheel journaled radially of the driven shaft, means for moving the wheel longitudinally of the shafts, means for constraining the said wheel to move radially toward the said shafts when moved longitudinally toward the driving shaft, whereby to cause successively the periphery of the said wheel to contact with the face of the disk on the driving shaft, and the face of the said wheel to contact with the periphery of the disk on the driven shaft, means for moving the disk on the driven shaft toward and from the driving shaft, means operated by the said disk to directly connect the shafts at the end of its movement toward the driving shaft, and means for mounting the said wheel to move radially with respect to the shafts.

12. In a device of the class described, a driven shaft and a driving shaft in alinement with each other, a disk keyed to each of said shafts and slidable thereon, a wheel journaled radially of the driven shaft, means including a yielding connection for moving the wheel longitudinally of the shafts, means for constraining the said wheel to move radially toward the said shaft when moved longitudinally toward the driving shaft, whereby to cause successively the periphery of the said wheel to contact with the face of the disk on the driving shaft, and the face of the said wheel to contact with the periphery of the disk on the driven shaft, means for moving the disk on the driven shaft toward and from the driving shaft, and means operated by the said disk to directly connect the shafts at the end of its movement toward the driving shaft.

13. In a device of the class described, a driven shaft and a driving shaft in alinement with each other, a disk keyed to each of said shafts and slidable thereon, a wheel journaled radially of the driven shaft, means for moving the wheel longitudinally of the shaft, means for constraining the said wheel to move radially toward the said shaft when moved longitudinally toward the driving shaft, whereby to cause successively the periphery of the said wheel to contact with the face of the disk on the driving shaft, and the face of the said wheel to contact with the periphery of the disk on the driven shaft, means for moving the disk on the driven shaft toward and from the driving shaft, means operated by the said disk to directly connect the shafts at the end of its movement toward the driving shaft, and yielding means normally pressing the disk on the driving shaft toward the driven shaft.

14. In a device of the class described, a driven shaft and a driving shaft in alinement with each other, a disk keyed to each of said shafts and slidable thereon, a wheel journaled radially of the driven shaft, means for moving the wheel longitudinally of the shafts, means for constraining the said wheel to move radially toward the said shaft when moved longitudinally toward the driving shaft, whereby to cause successively the periphery of the said wheel to contact with the face of the disk on the driving shaft and the face of the said wheel to contact with the periphery of the disk on the driven shaft, means for moving the disk on the driven shaft toward and from the driving shaft, and means operated by the said disk to directly connect the shafts at the end of its movement toward the driving shaft.

15. In a device of the class described, a driven shaft and a driving shaft in alinement with each other, a disk slidable on the driving shaft and keyed thereto, a disk slidable on the driven shaft and keyed thereto, a clutch for directly connecting the shafts, a plurality of wheels journaled radially of the shafts and adapted to contact at their peripheries with the disk on the driving shaft and at their faces with the disk on the driven shaft, means for constraining the wheels to move radially toward the driven shaft when they are moved toward the driving shaft and for constraining the said wheels to move radially away from the driven shaft when they are moved away from the driving shaft, means for simultaneously moving the said wheels, and means operated by the disk on the driven shaft at the end of its movement toward the driving shaft for operating the clutch to directly connect the shafts.

16. In a device of the class described, a driving shaft and a driven shaft, a disk slidable on the driven shaft and keyed thereto, a disk slidable on the driving shaft and keyed thereto, a variable speed connection between the disks, means for operating said connection to connect the disks at different speeds, and means operated by the said operating means to directly connect the shafts when the disks are moving at approximately the same speed.

17. In a device of the class described, a driven shaft, a plurality of wheels journaled radially with respect thereto, a disk slidable on the driven shaft, and adapted to engage the faces of the wheels with its periphery, means for moving the said disk, a driving shaft, a disk slidable on the driving shaft and keyed thereto and adapted to engage the peripheries of the wheels with its face, and yielding means normally pressing the wheels toward the driven shaft.

18. In a device of the class described, a driven shaft, a driving shaft in alinement therewith, a disk slidable on each of said shafts and keyed thereto, a plurality of bars arranged longitudinally of the shafts in spaced relation, a wheel journaled in each of said bars on an axis radial to the shafts, yielding means normally pressing the said wheels toward the shafts, means for moving the said bars longitudinally of the shafts, and means for constraining the said bars to move toward the shafts, when they are moved toward the driving shaft.

19. In a device of the class described, a driving shaft and a driven shaft in alinement with each other, a plurality of bars arranged longitudinally of the said shafts, a wheel journaled in each of said bars on an axis radial to the shafts, a disk slidable on each of said shafts, and keyed thereto, the disk on the driven shaft being adapted to contact with its periphery the faces of the wheels, and the disk on the driving shaft being adapted to contact with its face the peripheries of the wheels, and means including a yielding connection for moving said bars in unison.

20. In a device of the class described, a driving shaft and an alined driven shaft, a disk slidable on each of the shafts and keyed thereto, a plurality of wheels journaled radially to the shafts for connecting the disks, means including a yielding connection for moving the wheels longitudinally of the shaft whereby to cause successively the peripheries of the said wheels to contact with the face of the disk on the driving shaft, and the faces of the said wheels to contact with the periphery of the disk on the driven shaft, means for moving the disk on the driven shaft toward and from the driving shaft, means operated by the disk on the driven shaft for directly connecting the shafts at the limit of its movement toward the driving shaft, a spring for returning said wheels to original position, means for mounting said wheels to yield radially with respect to the shafts, means for moving the disk on the driving shaft toward and from the driven shaft, and a spring pressing the said disk toward the driven shaft.

21. In a device of the class described, a driving shaft and an alined driven shaft, a disk slidable on each of the shafts and keyed thereto, a plurality of wheels journaled radially to the shafts for connecting the disks, means including a yielding connection for moving the wheels longitudinally of the shaft whereby to cause successively the periphery of the said wheels to contact with the face of the disk on the driving shaft, and the faces of the said wheels to contact with the periphery of the disk on the driven shaft, means for moving the disk on the driven shaft toward and from the driving shaft, means operated by the disk on the driven shaft for directly connecting the shafts at the limit of its movement toward the driving shaft, a spring for returning said wheel to original position, means for mounting said wheels to yield radially with respect to the shafts, and means for moving the disk on the driving shaft toward and from the driven shaft.

22. In a device of the class described, a driving shaft and an alined driven shaft, a disk slidable on each of the shafts and keyed thereto, a plurality of wheels journaled radially to the shafts for connecting the disks, means including a yielding connection for moving the wheels longitudinally of the shaft whereby to cause successively the periphery of the said wheels to contact with the face of the disk on the driving shaft, and the faces of the said wheels to contact with the periphery of the disk on the driven shaft, means for moving the disk on the driven shaft toward and from the driving shaft, means operated by the disk on the driven shaft for directly connecting the shafts at the limit of its movement toward the driving shaft, a spring for returning said wheel to original position, and means for mounting said wheels to yield radially with respect to the shafts.

23. In a device of the class described, a driving shaft and an alined driven shaft, a disk slidable on each of the shafts and keyed to the shaft, a plurality of wheels journaled radially to the shafts for connecting the disks, means including a yielding connection for moving the wheels longitudinally of the shaft whereby to cause successively the periphery of the said wheels to contact with the face of the disk on the driving shaft, and the faces of the said wheels to contact with the periphery of the disk on the driven shaft, means for moving the disk on the driven shaft toward and from the driving shaft, means operated by the disk on the driven shaft for directly connecting the shafts at the limit of its movement toward the driving shaft, and a spring for returning said wheel to original position.

24. In a device of the class described, a driving shaft and an alined driven shaft, a disk slidable on each of the shafts and keyed to the shaft, a plurality of wheels journaled radially to the shafts for connecting the disks, means including a yielding connection for moving the wheels longitudinally of the shaft whereby to cause successively the peripheries of the said wheels to contact with the face of the disk on the driving shaft, and the faces of the said wheels to contact with the periphery of the disk on the driven shaft, means for moving the disk on the driven shaft toward and from the driving shaft, means operated by the disk on the driven shaft for directly connecting the shafts at the limit of its movement toward the driving shaft, and a spring for returning said wheel to original position.

25. In a device of the class described, a driving shaft and an alined driven shaft, a disk slidable on each of the shafts and keyed to the shafts, a plurality of wheels journaled radially to the shafts for connecting the disks, means including a yielding connection for moving the wheels longitudinally of the shaft whereby to cause successively the periphery of the said wheels to contact with the face of the disk on the driving shaft, and the faces of the said wheels to contact with the periphery of the disk on the driven shaft, means for moving the disk on the driven shaft toward and from the driving shaft, and means operated by the disk on the driven shaft for directly connecting the shafts at the limit of its movement toward the driving shaft.

26. In a device of the class described, a driving shaft and a driven shaft, means for directly connecting the shafts, a variable speed connection between the shafts, means for operating the said connection to cause the shafts to rotate at different speeds and means in connection with the variable speed connection for operating the direct connecting means to connect the shafts when the said shafts are moved at approximately the same speed.

27. In a device of the class described, a driving shaft and a driven shaft, a disk slidable on each of the said shafts, and constrained to rotate therewith, a variable speed connection between the disks, means for operating the said connection, means for directly connecting the shafts, and means in connection with the operating means of the variable speed connection for actuating the said direct connecting means to directly connect the shafts when the said shafts are moving at approximately the same speed.

GEORGE WASHINGTON MEREDITH.

Witnesses:
A. H. MOYER,
N. A. L. EMESOURER.

Copies of this patent may be obtained for five cents each, by addressing the "Commissioner of Patents Washington, D. C."